United States Patent Office 2,944,621
Patented July 12, 1960

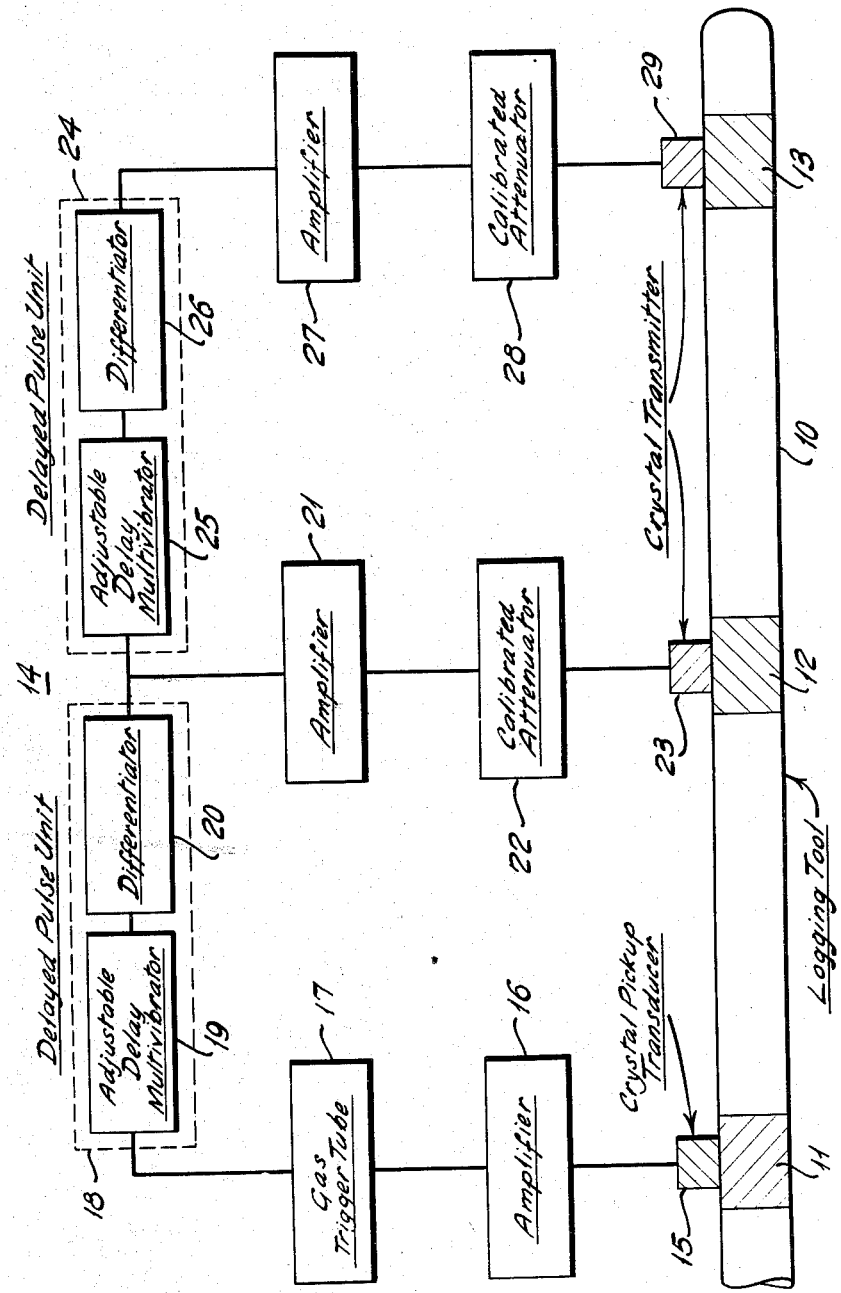

2,944,621

TESTING DEVICE FOR ACOUSTICAL LOGGING SYSTEM

Robert J. Loofbourrow, Bellaire, Tex., assignor to Texaco Inc., a corporation of Delaware Filed Feb. 6, 1956, Ser. No. 563,579

11 Claims. (Cl. 181—.5)

This invention relates to acoustical well logging apparatus and more particularly to a device for testing an acoustical velocity logging system.

It has been proposed heretofore to survey wells or earth bores by generating sound or acoustic waves at a given level in a well and then measuring the velocity of sound propagation through the surrounding earth strata thereby to determine the acoustic properties of the strata. The determinations may be made at a number of different levels so as to ascertain the variation in acoustic properties of the strata throughout the entire depth of the well. The velocity of sound through a given stratum may be determined by measuring the time difference or lapse between the instant of transmission and the instant of reception of a sound wave or pulse. Thus, if the transmitter and receptor are separated a known distance $d$, then $$v = \frac{d}{t}$$

where $v$ is equal to the velocity of sound propagation, $d$ is equal to the distance of travel of the sound wave and $t$ is equal to the time of travel of the wave. As indicated by the foregoing equation, the velocity of sound propagation is inversely proportional to the time of travel.

The velocity of sound propagated through a given stratum surrounding an earth bore may also be determined by transmitting a pulse of acoustic energy at a given level and then measuring the time differential between the instant of detection of the pulse by each of two receptors spaced a fixed distance apart in the earth bore, the receptors being spaced from the transmitter such that a transmitted sound wave passes both receptors while traveling in the same direction.

In my copending U.S. patent application having Serial No. 157,495, filed April 22, 1950, now abandoned in favor of a continuation application having Serial No. 574,844, filed March 29, 1956, I have described my acoustical velocity logging system which includes a transducer for transmitting acoustic energy and two transducers for receiving the transmitted acoustic energy and for converting it into corresponding electrical waves or pulses. This device also includes a time measuring circuit for determining the time difference between the instant of detection of a given pulse of acoustic energy at one receiving transducer and the instant of detection of that pulse at the second receiving transducer and means for recording this time difference, or, by conversion, the velocity of propagation of the sound wave, against well depth. My acoustical velocity logging system further includes a tool or sonde for housing the transmitting transducer and the two receiving transducers and for maintaining the transducers at fixed distances from each other. The tool has the form of an elongated cylindrical closed shell of relatively small diameter such that it can be lowered and raised within the well or earth bore. This shell and the three transducers constitute a unitary structure attached to a conductor cable for passing electrical energy to and from the tool and for suspending or supporting the tool in the earth bore. Each transducer is mounted in the tool so that it may be readily coupled to the earth strata surrounding the bore through the fluid or mud in the bore.

It is an object of this invention to produce a device for testing the operative condition of an acoustical velocity logging system.

It is another object of this invention to produce a testing device which will enable an operator of an acoustical velocity logging system to test the logging system thoroughly without having to open the shell or casing of the tool.

It is a further object of this invention to produce a simple testing device which will more quickly enable an operator to test his acoustical well logging system than with the use of standard electrical test equipment such as an oscilloscope.

In accordance with the present invention and in one form thereof there is provided an acoustical testing device which includes a receiving transducer for converting acoustic energy into first electric energy, means responsive to the electric energy for producing delayed electric energy at a predetermined time after the arrival thereat of the first electric energy and a transmitting transducer for converting the delayed electric energy into second acoustic energy. The testing device may additionally include means responsive to the delayed electric energy for producing second delayed electric energy at a predetermined time after the arrival thereat of the first delayed electric energy and a second transmitting transducer converting the second delayed electric energy into third acoustic energy.

For a more complete understanding of the present invention reference may now be had to the following description taken in conjunction with the accompanying drawing wherein:

The figure schematically illustrates in block form a testing device in accordance with this invention and a portion of the tool or sonde of an acoustic velocity logging system employing one transmitter and two receivers.

Referring to the figure in more detail, the tool or sonde 10 of an acoustical velocity logging system of the type described in my above-mentioned copending application includes one transmitting transducer 11 and two receiving transducers 12 and 13. The testing device 14 includes a receiving transducer 15 which may be conveniently directly coupled to the transmitting transducer 11 of the tool 10. The receiving transducer 15 detects acoustic pulses transmitted by the transmitting transducer 11 of the tool 10 and converts these acoustic pulses into corresponding electric pulses. The electric pulses are amplified by an amplifying device 16 which has its output coupled to a gas trigger tube 17, for example, a thyratron. The amplified pulses cause the gas trigger tube 17 to produce a single sharp pulse which is applied to the first delayed pulse unit 18, which may, for example, comprise an adjustable delay one shot or monostable multivibrator 19 and a differentiator 20. A square wave voltage is generated by multivibrator 19 and fed into the differentiator 20 for deriving a sharp pulse from the trailing edge of the square wave which is then amplified by amplifier 21, preferably having a cathode follower output producing a signal of fixed amplitude. The fixed amplitude signal is then fed into a calibrated attenuator 22 before being applied to a first transmitting transducer 23 which is adapted to be readily directly coupled to the receiving transducer 12 of the well logging tool 10.

The sharp pulse derived from differentiator 20, in addition to being applied to the amplifier 21, is also applied to a second delayed pulse unit 24 which may also, for example, comprise an adjustable delay one shot or monostable multivibrator 25 and a differentiator 26. A square wave voltage is generated by multivibrator 25 and fed into the differentiator 26 for deriving a sharp pulse from the trailing edge of the square wave generated by multivibrator 25. This pulse is then amplified by amplifier 27 which preferably has a cathode follower output producing a signal of fixed amplitude. The fixed amplitude signal from amplifier 27 is fed into a calibrated attenuator 28 before being applied to a second transmitting transducer 29 which is adapted to be readily directly coupled to the receiving transducer 13 of the well logging tool 10. Each of the above-mentioned transducers may, for example, comprise a magnetostrictive element or a piezoelectric crystal, such as an ammonium dihydrogen phosphate (ADP) type crystal.

In the operation of the testing device, the receiving transducer 15 of the device 14 is directly coupled to the transmitting transducer 11 of the tool 10, the first transmitting transducer 23 and the second transmitting transducer 29 of the device 14 are coupled to receiving transducers 12 and 13, respectively, of the tool of the acoustic well logging system under test. A liquid or oil film may be used at the interface of the coupled transducers to improve the acoustic coupling therebetween. When a pulse is transmitted from the transmitting transducer 11 of tool 10, the receiving transducer 15 of the testing device 14 detects this pulse and converts it into an electric pulse which after amplification by amplifier 16 fires the gas trigger tube 17 to produce a single sharp pulse which initiates the operation of the delayed pulse unit 18 and more particularly the multivibrator 19 which produces a square wave having a duration or width determined by the time constants of the multivibrator, as is well known by those skilled in the art. The square wave is then differentiated by differentiator 20 which produces a sharp pulse which is applied to channels leading to both the first and second transmitting transducers 23 and 29 of the testing device 14. The sharp pulse derived from the differentiated trailing edge of the square wave from multivibrator 19 is applied to the first transmitting transducer via amplifier 21, which preferably has a cathode follower output producing a fixed amplitude signal, and a calibrated attenuator 22. This same sharp pulse which is derived from differentiator 20 is also applied to the delayed pulse unit 24, operating in substantially the same manner as delayed pulse unit 18 for producing a delayed pulse which is amplified by amplifier 27, also preferably having a cathode follower output producing a signal of fixed amplitude. The pulse from amplifier 27 is then attenuated by calibrated attenuator 28 before being applied to the second transmitting transducer 29. Delayed pulse units 18 and 24 may each have a calibrated adjustable delay multivibrator, however, since the time measuring circuit of the acoustic velocity logging system having tool 10 is responsive only to the pulses detected at its receivers 12 and 13, only delayed pulse unit 24 of the testing device need be calibrated. However, when testing a system which has only one receiver, second delayed pulse unit 24, second amplifier 27, second calibrated attenuator 28 and second transmitting transducer 29 are not needed, but in that event the multivibrator 19 of delayed pulse unit 18 should be calibrated.

It can readily be seen that the delay time of a pulse from delayed pulse unit 24 can be made to equal the interval of time required for an acoustic pulse from transmitting transducer 11 of tool 10 to travel in a particular stratum surrounding an earth bore between receiving transducers 12 and 13 of the tool 10. Furthermore, it can be readily seen that if multivibrator 25 has been properly calibrated the recorded output reading of the acoustic velocity logging system under test should correspond to the reading of the calibrated adjustable delay multivibrator 25. As previously mentioned, delayed pulse unit 18 need not be calibrated since a two receiver acoustic velocity logging system would not ordinarily record the time required for an acoustic pulse to travel from its transmitting transducer to the first receiving transducer. However, it is desirable to utilize a delayed pulse unit between the receiving transducer 15 and the first transmitting transducer 23 in order to determine whether spillover pulses between transmitting transducer 11 and receiving transducer 12 of tool 10 are interfering with the proper operation of the acoustic velocity logging system. The delay time of the delayed pulse unit 18 of course corresponds to the interval of time required for an acoustic pulse from transmitting transducer 11 to reach receiving transducer 12.

Calibrated attenuators 22 and 28 have been inserted into the testing device in order to determine the minimum signal which can be detected by the receivers 12 and 13 of tool 10. The minimum signal from the testing device 14 which will operate the receiver circuits of tool 10 is a measure of the sensitivity of each of the receiver circuits. If during a test of an acoustic velocity logging system the attenuator setting indicates that a considerably stronger signal than the minimum signal is required to operate the logging system it can reasonably be presumed that the system is not in proper working condition.

Accordingly, this invention provides an acoustical testing device which enables an operator to test his acoustical velocity logging system thoroughly without even having to open the tool casing or shell and more rapidly than with the use of standard electrical test equipment such as an oscilloscope. This testing device produces apparatus which is capable of checking the sensitivity of each channel of the well logging system and the operation and accuracy of the velocity indicating equipment within the tool casing up to and including the surface indicating equipment of the system. A further test can enable the operator to check the system circuitry for a full range of velocities over which the circuits must operate satisfactorily by properly varying the time constant of the calibrated multivibrator. The knowledge that an acoustical velocity logging system is not functioning properly before it is lowered into the earth bore is well appreciated by those skilled in the art of acoustical velocity logging.

Obviously, many modifications and variations of the invention as hereinabove set forth may be made without departing from the spirit and scope thereof and therefore only such limitations should be imposed as are indicated in the appended claims.

I claim:

1. An acoustical testing device for testing the operation of an acoustical velocity well logging system which has means for producing acoustic energy and means for receiving acoustic energy, said device comprising an acoustical receiving transducer operatively coupled to said acoustic energy producing means for converting said acoustic energy into first electric energy, means responsive to said electric energy for producing delayed electric energy at a predetermined time after the arrival thereat of said first electric energy, an acoustical transmitting transducer operatively coupled to said acoustic energy receiving means at a point spaced from said acoustical receiving transducer for converting said delayed electric energy into second acoustic energy for transmission to the receiving means of the acoustical velocity logging system and a calibrated attenuator interposed between said delayed electric energy producing means and said transmitting transducer for controlling the strength of the delayed electric energy applied to said transmitting transducer.

2. An acoustical testing device for testing the operation of an acoustical velocity logging system which has means for producing acoustic energy and first and second means for receiving acoustic energy, said device comprising an acoustical receiving transducer converting said acoustic energy into first electric energy, means responsive to said electric energy for producing delayed electric energy at a predetermined time after the arrival thereat of said first electric energy, a first acoustical transmitting transducer converting said delayed electric energy into second acoustic energy for transmission to the first receiving means of the acoustical velocity logging system and a first calibrated attenuator interposed between said delayed electric energy producing means and said first transmitting transducer for controlling the strength of the delayed electric energy applied to said first transmitting transducer, means responsive to said delayed electric energy for producing second delayed electric energy at a predetermined time after the arrival thereat of said first first delayed electric energy, a second acoustical transmitting transducer converting said second delayed electric energy into third acoustic energy for transmission to the second receiving means of the acoustical logging system and a second calibrated attenuator interposed between the second delayed electric producing means and said second transmitting transducer for controlling the strength of the second delayed electric energy to said second transmitting transducer.

3. An acoustical testing device for testing the operation of an acoustical velocity well logging system which has means for producing acoustic energy and means for receiving acoustic energy, said device comprising an acoustical receiving transducer operatively coupled to said acoustic energy producing means for converting said acoustic energy into electric energy, a delayed pulse unit responsive to said electric energy for producing a delayed pulse at a predetermined time after the arrival thereat of said electric energy and an acoustical transmitting transducer operatively coupled to said acoustic energy receiving means at a point spaced from said acoustical receiving transducer for converting said delayed pulse into an acoustic pulse for transmission to the receiving means of the acoustical velocity logging system.

4. An acoustical testing device as set forth in claim 3 wherein said delayed pulse unit comprises an adjustable delay multivibrator and a differentiator coupled to the output of said multivibrator.

5. An acoustical testing device for testing the operation of an acoustical velocity logging system which has means for producing acoustic energy and first and second means for receiving acoustic energy, said device comprising an acoustical receiving transducer converting said acoustic energy into first electric energy, a first delayed pulse unit responsive to said electric energy for producing a first delayed pulse at a predetermined time after the arrival thereat of said electric energy, a first acoustical transmitting transducer converting said delayed pulse into a first acoustic pulse for transmission to the first receiving means of the acoustical velocity logging system, a second delayed pulse unit responsive to said first delayed pulse for producing a second delayed pulse at a predetermined time after the arrival thereat of said first delayed pulse and a second acoustical transmitting transducer converting said second delayed pulse into a second acoustic pulse for transmission to the second receiving means of the acoustical velocity logging system.

6. An acoustical testing device as set forth in claim 5 wherein said second delayed pulse unit comprises a calibrated adjustable delay multivibrator and a differentiator coupled to the output of said multivibrator.

7. An acoustical testing device for testing the operation of an acoustical velocity logging system which has means for producing an acoustic pulse and means for receiving an acoustic pulse, said device comprising a receiving transducer converting said acoustic pulse into a first electric pulse, means for amplifying said first electric pulse, a gas trigger tube responsive to said amplified electric pulse for producing a sharp electric pulse, a delayed pulse unit responsive to said sharp pulse for producing a delayed pulse at a predetermined time after the arrival thereat of said sharp pulse, said delayed pulse unit comprising a calibrated adjustable delay multivibrator and a differentiator coupled to the output of said multivibrator, an amplifier having an output producing a fixed amplitude pulse for amplifying said delayed pulse, a calibrated attenuator for controlling the amplitude of said fixed amplitude pulse and a transmitting transducer converting the pulse from said attenuator into a second acoustic pulse for transmission to the receiving means of the acoustical velocity logging system.

8. An acoustical testing device for testing the operation of an acoustical velocity logging system which has means for producing an acoustic pulse and first and second means for receiving an acoustic pulse, said device comprising a receiving transducer converting said acoustic pulse into a first electric pulse, an amplifier for amplifying said first electric pulse, a gas trigger tube responsive to said amplified first electric pulse for producing a sharp electric pulse, a first delayed pulse unit responsive to said sharp electric pulse for producing a first delayed pulse at a predetermined time after the arrival thereat of said sharp electric pulse, said first delayed pulse unit comprising an adjustable delay multivibrator and a first differentiator coupled to the output of said multivibrator, a first amplifier having an output producing a fixed amplitude pulse for amplifying said first delayed pulse, a first calibrated attenuator for varying the amplitude of said fixed amplitude pulse, a first transmitting transducer converting the pulse from said first calibrated attenuator into a second acoustic pulse for transmission to the first receiving means of the acoustical velocity logging system, a second delayed pulse unit responsive to said first delayed pulse for producing a second delayed pulse at a predetermined time after the arrival thereat of said first delayed pulse, said second delayed pulse unit comprising a calibrated adjustable delay multivibrator and a second differentiator coupled to the output of said calibrated multivibrator, a second amplifier having an output producing a fixed amplitude pulse for amplifying said second delayed pulse, a second calibrated attenuator for varying the amplitude of said fixed amplitude pulse from said second amplifier and a second transmitting transducer for converting the pulse from said second attenuator into a third acoustic pulse for transmission to the second receiving means of the acoustical velocity logging system.

9. An acoustical testing device for testing the operation of an acoustical velocity logging system which has means for producing acoustic energy and means for receiving acoustic energy, said device comprising a receiving transducer converting said acoustic energy into electric energy, a delayed pulse unit responsive to said electric energy for producing a delayed pulse at a predetermined time after the arrival thereat of said electric energy, an amplifier having an output producing a pulse of fixed amplitude for amplifying said delayed pulse, a calibrated attenuator coupled to the output of said amplifier for controlling the amplitude of the fixed amplitude pulse from said amplifier and for producing a calibrated pulse and a transmitting transducer converting said calibrated pulse into an acoustic pulse for transmission to the receiving means of the acoustical velocity logging system.

10. An acoustical testing device for testing the operation of an acoustical velocity logging system which has means for producing acoustic energy and first and second means for receiving acoustic energy, said device comprising a receiving transducer converting said acoustic energy into first electric energy, a first delayed pulse unit responsive to said electric energy for producing a first delayed pulse at a predetermined time after the arrival thereat of said electric energy, a first amplifier having an output producing a fixed amplitude pulse for amplifying said first delayed pulse, a first calibrated attenuator coupled to the output of said first amplifier for controlling the amplitude of said fixed amplitude pulse and for producing a first calibrated pulse, a first acoustical transmitting transducer converting said calibrated pulse into a first acoustic pulse for transmission to the first receiving means of the acoustical velocity logging system, a second delayed pulse unit responsive to said first delayed pulse for producing a second delayed pulse at a predetermined time after the arrival thereat of said first delayed pulse, a second amplifier having an output producing a fixed amplitude pulse for amplifying said second delayed pulse, a second calibrated attenuator coupled to the output of said second amplifier for controlling the amplitude of the fixed amplitude pulse from said second amplifier and for producing a second calibrated pulse and a second transmitting transducer converting said second calibrated pulse into a second acoustic pulse for transmission to the second receiving means of the acoustical velocity logging system.

11. Apparatus for testing an acoustical velocity well logging system having an elongated exploring tool which indicates the time of travel of an acoustic wave between two spaced transducers on said tool comprising means operatively coupled to said tool at one of said two transducers for producing a first electric pulse indicative of the occurrence of acoustic energy at said one transducer, means responsive to said first pulse producing means for producing a second electric pulse at a predetermined time after said first pulse is produced and means responsive to said second pulse producing means and operatively coupled to said tool at the other of said two transducers for converting said second pulse into acoustic energy for transmission to said tool at said other transducer.

References Cited in the file of this patent

UNITED STATES PATENTS

| | | |
|---|---|---|
| 1,540,317 | Craft et al. | June 2, 1925 |
| 2,275,736 | Cloud | Mar. 10, 1942 |
| 2,477,485 | Jacob | July 26, 1949 |
| 2,505,525 | Clapp et al. | Apr. 25, 1950 |
| 2,704,364 | Summers | Mar. 15, 1955 |